(12) United States Patent
Sung (10) Patent No.: US 6,829,386 B2
(45) Date of Patent: Dec. 7, 2004

(54) METHODS AND APPARATUS FOR ASSOCIATING CHARACTER CODES WITH OPTIMIZED CHARACTER CODES

(75) Inventor: Ienup Sung, San Jose, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 629 days.

(21) Appl. No.: 09/796,875

(22) Filed: Feb. 28, 2001

(65) Prior Publication Data

US 2002/0118877 A1 Aug. 29, 2002

(51) Int. Cl.[7] .................................................. G06K 9/00
(52) U.S. Cl. ................................... 382/181; 382/185
(58) Field of Search ............................... 382/181, 185, 382/229, 232, 276; 341/50–52, 55, 106, 107

(56) References Cited

U.S. PATENT DOCUMENTS 5,889,481 A * 3/1999 Okada ........................ 341/51
6,204,782 B1 * 3/2001 Gonzalez et al. ............. 341/90
6,422,476 B1 * 7/2002 Ackley ...................... 235/494

OTHER PUBLICATIONS

Erickson "Options for presentation of multilingual text: use of the Unicode standard", digital information associate research project, pp. 1–24, 1997.*

* cited by examiner

Primary Examiner—Daniel Miriam
(74) Attorney, Agent, or Firm—Beyer Weaver & Thomas, LLP (57) ABSTRACT

A system identifies a character code. This character code may be received from keyboard entry, read from memory, or acquired from an external network, for example. This character code can comprise an arrangement of bytes. Each byte can be identified as a group, plane, row, or cell. The row and plane values of the character code can be mapped to corresponding row and plane values of an optimized character code. Character attributes associated with each optimized character code can be accessed. The row and plane values of optimized character codes can be mapped to corresponding row and plane values of character codes.

43 Claims, 7 Drawing Sheets

METHODS AND APPARATUS FOR ASSOCIATING CHARACTER CODES WITH OPTIMIZED CHARACTER CODES

BACKGROUND OF THE INVENTION

The present invention relates to coded character sets. More particularly, the present invention provides methods and apparatus for mapping a coded character set with a second coded character set associated with character attributes. The frame of reference for the present invention is a system that accesses character attributes.

The use of different character coding sets in various software environments has caused incompatibility between computer systems and code ambiguity. Different coding sets are required to represent text, mathematical, scientific, and musical symbols. Specialized character coding sets are needed, for example, to represent Chinese or Japanese characters. Furthermore, codes used to represent one character or symbol in a particular coding set often represent a different character or symbol in a another coding set. For example, some codes may represent the first byte of a two byte ideograph in a different coding set.

The growth of the Internet and the need for software that can be used in different environments and platforms has created a push for universal character coding sets. These universal coding sets contain a character set standard that can be used in many different software environments. One example of such a universal coding set is Unicode. Unicode allows assignment of characters to codes ranging from code 0x00 to code 0x10FFFF. The coding space under this definition allows Unicode to represent 1,114,112 different characters. Not surprisingly, however, many of the codes allocated in Unicode are not assigned. Unicode is described in ISO/IEC 10646-1 and is hereby incorporated by reference for all purposes. Aspects of Unicode are also described in the Unicode Technical Standard #6, available from Unicode Inc. and in Bits of Unicode by Mark Davis, available from the Unicode Consortium.

Each character in Unicode, and other universal coding sets, has a character code. Every character code is associated with a set of character attributes. Character attributes include collation weight, whether the character is printable, whether the character is upper or lower case, which character class the character belongs to, etc. The attributes associated with a character are accessed frequently. For example, when a user types a letter "b" into a computer system, the computer system examines the attributes associated with the character code for "b" to determine whether the character should be displayed on the screen. In another example, when a sort function is used to alphabetize a list of words, the attributes for each character in the list of words is examined to determine how the words are sorted alphabetically.

In Unicode, each character attribute set usually requires approximately 64 bytes of memory. Consequently, a system associating each allocated character code in Unicode with a character attribute set requires 1,114,112 times 64 bytes or 71,303,168 bytes of memory space. Due to this large memory requirement, many computer systems attempt to compress the Unicode, since many of the 1,114,112 possible character codes and character attribute sets are not used. By compressing this data, significant memory space is saved. However, decompression and compression each time a character attribute is accessed can be very inefficient. Other numeric mapping schemes can also consume valuable processing resources or additional memory space.

Each of the currently available techniques for mapping or compressing character code sets has disadvantages with regard to at least some of the desirable characteristics of accessing character attributes. It is therefore desirable to provide a system for mapping a character coding set (such as Unicode) to an optimized character coding set in which the mapping system exhibits desirable characteristics as well or better than the technologies discussed above.

SUMMARY OF THE INVENTION

According to the present invention, methods and apparatus are provided to map a character coding set to an optimized character coding set associated with an attribute set.

A system identifies a character code. This character code may be received from keyboard entry, read from memory, or acquired from an external network, for example. This character code comprises an arrangement of bytes. According to specific embodiments, each byte can be identified as a group, plane, row, or cell. The row is mapped to a corresponding row of an optimized character code. The group, plane, or cell of the character code and the optimized character code can be the same. Optionally, the plane, group, and cell are mapped to corresponding planes, groups, and cells of the optimized character code.

Each of the groups, planes, rows, and cells of character codes and optimized character codes can be a value identified by a particular arrangement of bits. In Unicode, the value of each group, plane, row, or cell is equivalent to one byte in a character code. Alternatively, the group, plane, row, or cell can be a value identified by any arrangement of bits in the character code and can be mapped to a different arrangement of bits in the optimized character code.

One aspect of the invention provides a method for mapping character codes to optimized character codes associated with character attributes. The method may be characterized by the following sequence: (1) receiving a character code having a string of bits; (2) identifying a first subset of bits in the character code, wherein the first subset of bits identifies a first row; and (3) mapping the first row to a second row associated with an optimized character code in an optimized character code index, wherein mapping the first row identifies an optimized character code for the received character code.

A second subset of bits in the character code can be mapped an identified as a first plane. The first plane can be mapped to a second plane associated with an optimized character code.

Another aspect of the invention provides an apparatus for mapping character codes to optimized character codes. The apparatus may be characterized by the following features: (1) memory; (2) an input mechanism for receiving a character code; (3) one or more processors coupled with the memory, the processors configured to identify a first subset of bits in the character code, wherein the first subset of bits identifies a first row and maps the first row to a second row associated with an optimized character code in the optimized character code index, wherein mapping the first row identifies an optimized character code for the received character code.

The one or more processor can be further configured to identify a second subset of bits in the character code, wherein the second subset of bits identifies a first plane. The one or more processor can also map the first plane to a second plane associated with an optimized character code in the optimized character code index.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media A further understanding of the nature and advantages of the present invention may be realized by reference to the remaining portions of the specification and the drawings.

DETAILED DESCRIPTION OF SPECIFIC EMBODIMENTS

Reference will now be made in detail to a specific embodiment of the invention. An example of the specific embodiment is illustrated in the accompanying drawings. While the invention will be described in conjunction with a specific embodiment, it will be understood that it is not intended to limit the invention to one specific embodiment. To the contrary, it is intended to cover alternatives, modifications, and equivalents as may be included within the spirit and scope of the invention as defined by the appended claims.

This invention pertains to methods and systems for mapping a character coding set to an optimized character coding set associated with character attributes. In Unicode, each character code is 32 bits in length. Unicode is described in ISO/IEC 10646-1 and is hereby incorporated by reference for all purposes. Aspects of Unicode are also described in the Unicode Technical Standard #6, available from Unicode Inc. and in Bits of Unicode by Mark Davis, available from the Unicode Consortium. For example, a 32-bit character code can be represented in binary as 0000 0000 0000 0000 0001 1010 0000 1101, in decimal form as 6696, or more conveniently in hexadecimal form as 0x001A0D. In another example, suppose the letter "n" is 0000 0000 0000 0001 1000 0011 0100 1110 in binary, 99150 in decimal form, and 0x000834E in hexadecimal form. Each byte of the 32-bit character code contains group, plane, row, and cell components. The first byte containing 0000 0000 is the group value. The second byte containing 0000 0001 is the plane value. The third byte containing 1000 0011 is the row value. The fourth byte containing 0100 1110 is the cell value.

Figure 1:
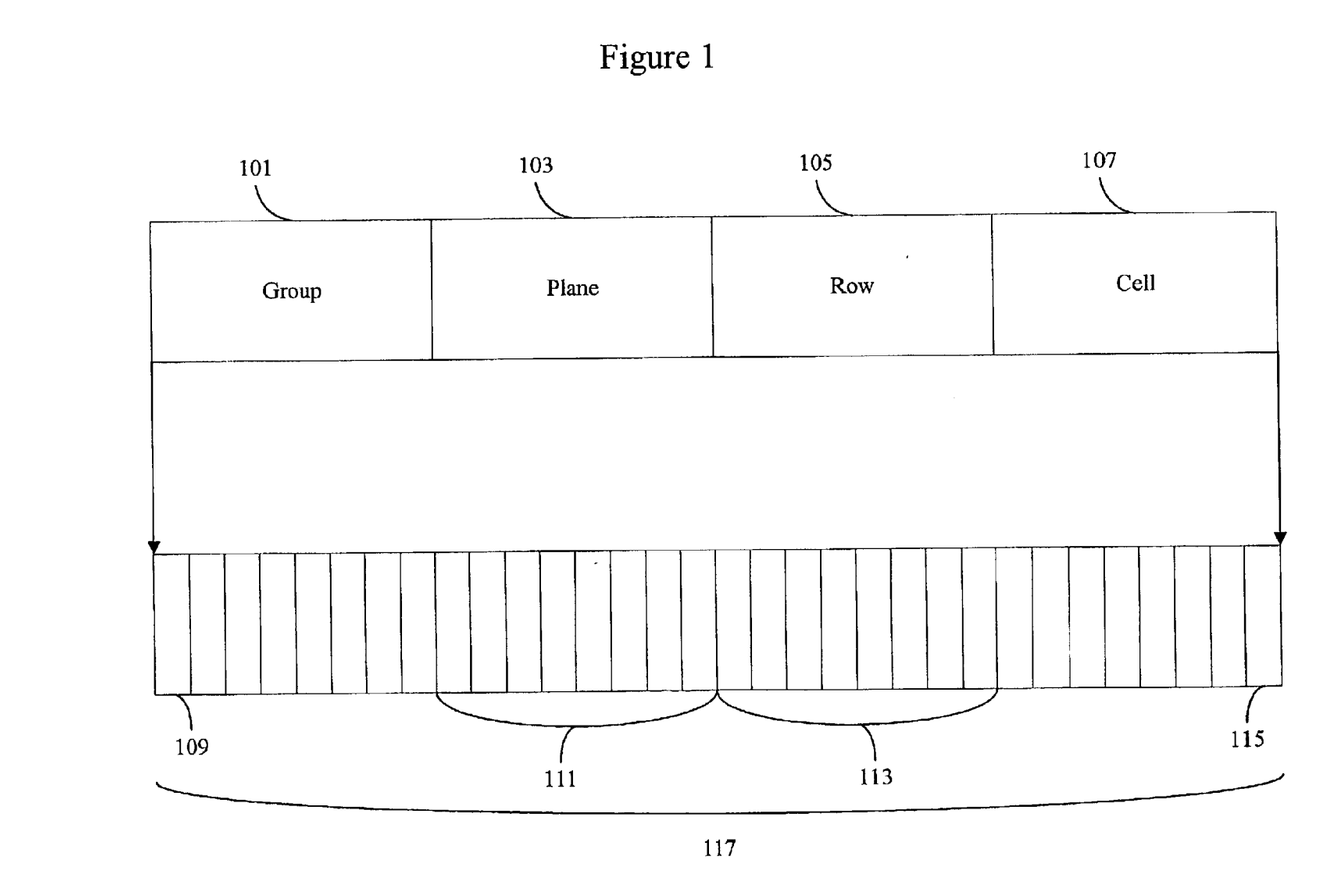
FIG. 1 is a diagram showing a character code associated with a group, plane, row, and cell, according to specific embodiments.

FIG. 1 shows how the group, plane, row, and cell components of a character code correspond with the bits of a single character code according to specific embodiments. Character code 117 comprises a group 101, a plane 103, a row 105, and a cell 107. Group 101 is composed of the most significant 8 bits, plane 103 the next 8 bits, row 105 the next 8 bits, and cell 107 the least significant 8 bits. Using the above noted example for the letter "n," the group is 0000 0000 in binary form, 0 in decimal form, and 0x00 in hexadecimal form. The group value for the letter "n" is 0. The plane is 0000 0001, 1 in decimal form, and 0x01 in hexadecimal form. The plane value for "n" is 1. The row is 1000 0011 in binary form, 131 in decimal form, and 0x83 in hexadecimal form. The row value is 131. The cell is 0100 1110 in binary form, 78 in decimal form, and 0x4E in hexadecimal form. The cell value is 78.

Plane 103 corresponds with a first subset of bits 111. Row 105 corresponds with a second subset of bits 113. Each of these subsets 111 and 113 contains eight bits equivalent to one byte. Cell 107 contains least significant bit 115 among its eight bits. Group 101 contains most significant bit 109 among its eight bits.

Figure 2:
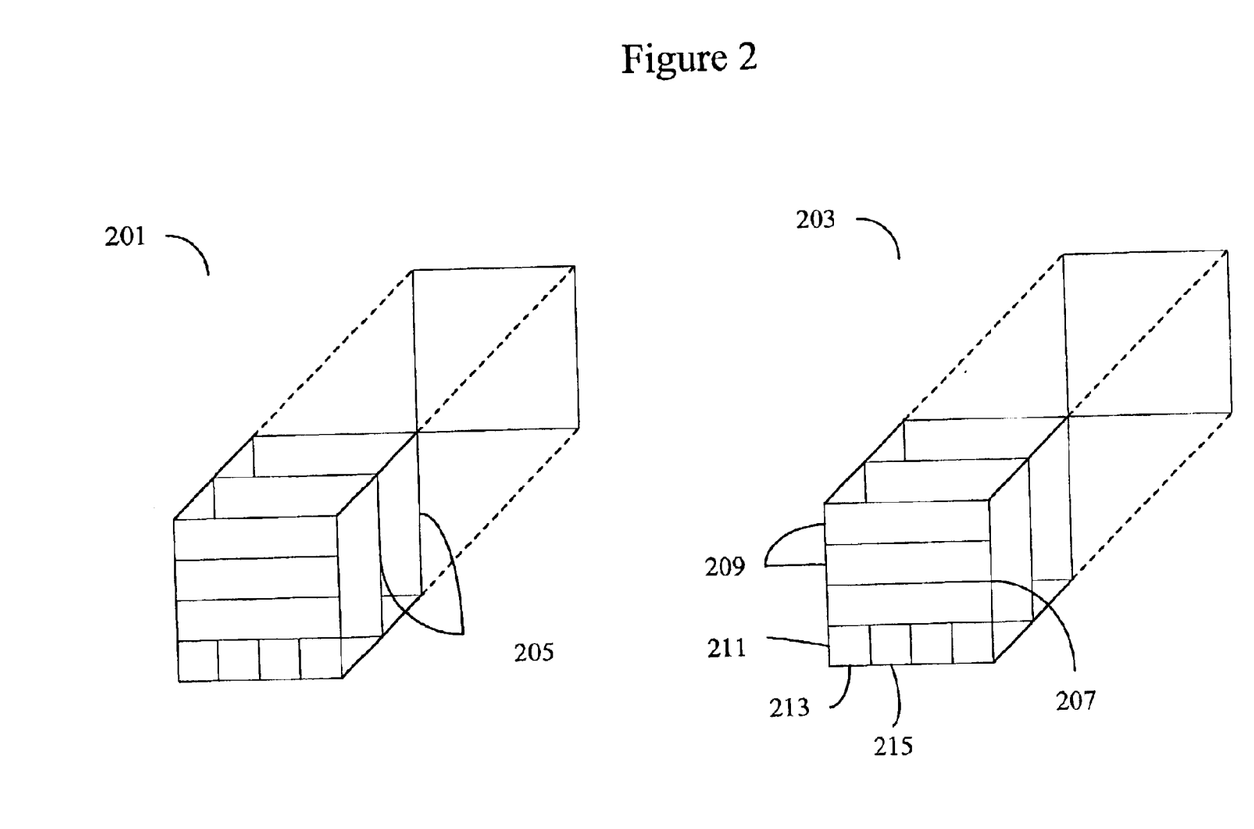
FIG. 2 is a diagram illustrating one representation of a group, plane, row, and cell, according to specific embodiments.

FIG. 2 shows a spatial representation of the group, plane, row, and cell components of a character code. Examples of a group are group 201 or group 203. Examples of a plane are plane 205 in group 201 and plane 207 in group 203. Examples of a row are 209 or 211 in plane 207. Examples of a cell are cell 213 or 215 in row 211. According to specific embodiments, each group, plane, row, and cell are associated with one octet or 256 possible values. Each plane contains 256 rows each containing 256 cells. Each plane consequently, contains 256×256 cells or 65,536 cells. Each of these character codes is associated with a character attribute set. Some of these character codes may be allocated while some remain unallocated.

Figure 3:
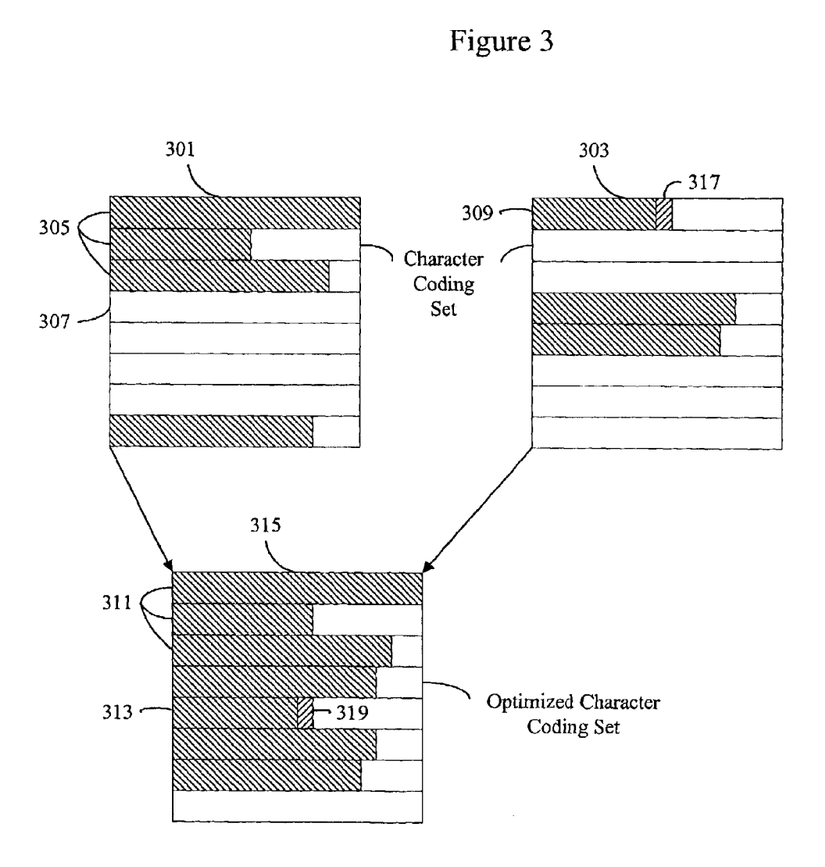
FIG. 3 is a diagram depicting one representing of the mapping of a character coding set to an optimized character coding set, according to specific embodiments.

FIG. 3 illustrates a mapping of a character coding set to an optimized character coding set according to specific embodiments. A character coding set has planes 301 and 303. An optimized character coding set has only plane 315. The rows of plane 301 and 303 that contain allocated character codes are mapped to the rows of plane 315. Plane 301 of a character coding set has rows 305 containing allocated character codes as well as rows 307 containing no allocated character codes. Rows 305 of plane 301 containing allocated character codes are mapped to rows 311 in plane 315 of the optimized character coding set. Row 309 of plane 303 containing allocated character codes is mapped to row 313 of plane 315 of the optimized character coding set.

According to specific embodiments, the cells of the mapped rows remain the same. Cells of row 309 are mapped directly to the cells of row 313. The cell values of the character coding set and the optimized character coding set are mapped directly with a one-to-one correspondence. A character code in plane 303, row 309, and cell 317 is now located in the optimized character coding set at plane 315, row 313, cell 319. The plane and row values can be mapped to different values while keeping the cell value the same. The group value likewise remains the same, since Unicode will not define any character value using group bytes. Planes 301 and 303 may have the same group value as plane 315. According to specific embodiments, the mapping of character coding set to an optimized character coding set requires the mapping of only plane and row values. Group and cell values remain the same.

According to specific embodiments, the Unicode character coding set is mapped to an optimized character coding set while keeping group and cell values the same. The processes described for this mapping can apply to other universal character coding sets. Furthermore, a character code with a plane value of 0 is mapped directly to an optimized character code also having a plane value of 0, while maintaining the same row value. Character codes with plane values not equal to 0 are mapped to optimized character codes with a plane value of 1. The allocated rows of the character coding set are mapped to rows in the optimized coding set in plane 1.

According to specific embodiments, the rows with allocated character codes in a character coding set are mapped onto the rows of more than one plane in the optimized character coding set. Where the sum of the number of rows in plane 301 and the number of rows in plane 303 is greater than the number of rows in plane 315, and additional plane may be required to contain the rows of planes 301 and 303.

Figure 4:
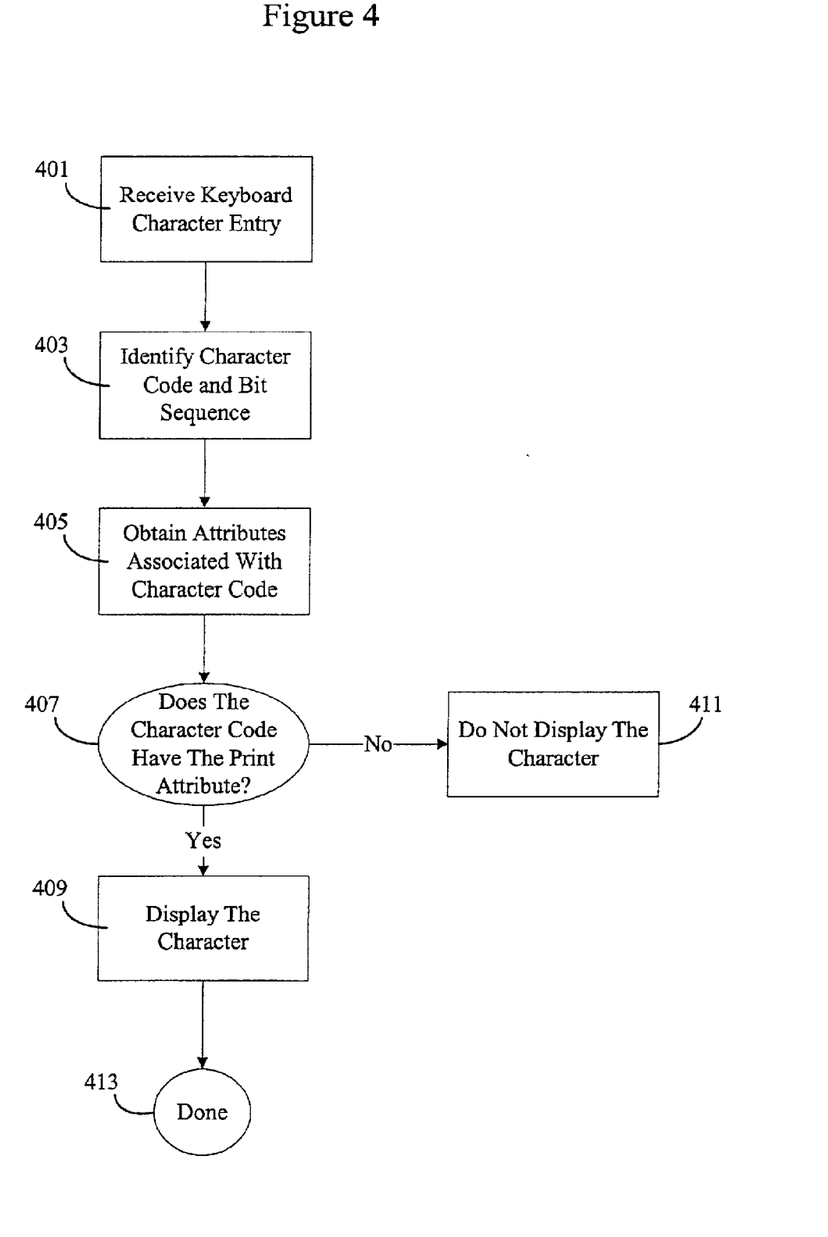
FIG. 4 is a process flow diagram showing one possible sequence that may require the use of the present invention, according to specific embodiments.

FIG. 4 is a process flow diagram showing the process of accessing character attributes that may require the use of the present invention, according to specific embodiments. A keyboard character entry is input into a computer system at 401. The character code and Unicode bit sequence for the character entry is identified at 403. In order to determine, for example, whether to display the entered character on a monitor, the computer system accesses the attributes associated with the character code at 405. Each character code is associated with an attribute set. The computer system determines whether the character code entered has the "print" attribute at 407. If the "print" attribute is not enabled for the entered character, the character is not displayed on a monitor at 411. If the "print" attribute is enabled, the character is displayed on a monitor at 409. The process can be used to access other attributes in the attribute set.

Figure 5:
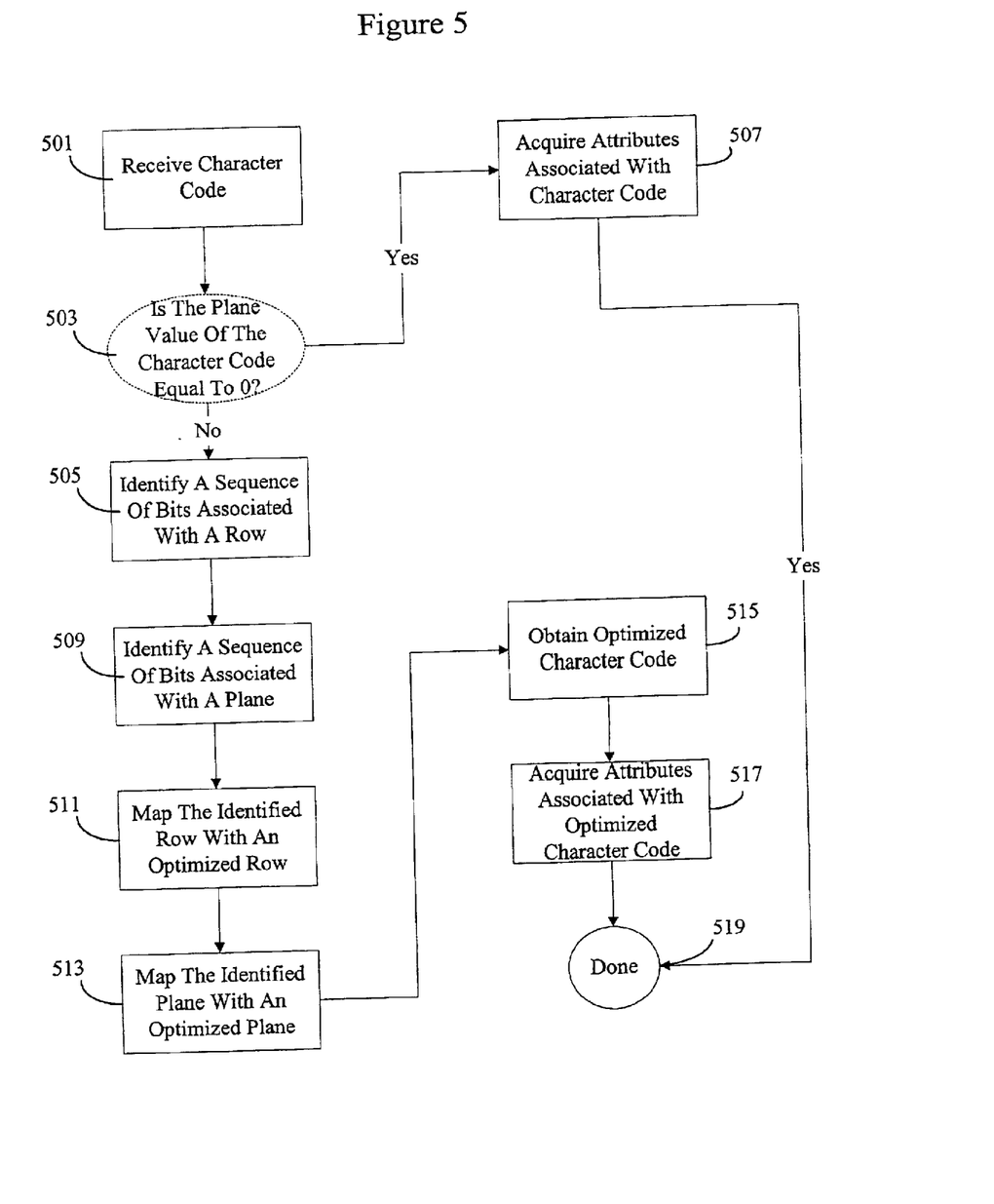
FIG. 5 is a process flow diagram illustrating the mapping of a character code to an optimized character code, according to specific embodiments.

FIG. 5 is a process flow diagram illustrating the mapping of a character code to an optimized character code, according to specific embodiments. The diagram provides detail on step 405 of FIG. 4. The computer system identifies the character entered at 501. According to specific embodiments, step 503 is an optional procedure designed to optimize the mapping of a character code to an optimized character code in Unicode. As noted above, if the plane value of a character code in Unicode is equal to zero, the character code can be the same as the optimized character code.

The character attributes can be accessed based on the character code at 507. If the plane value is not equal to 0, or if step 503 is not performed, the computer system identifies a sequence of bits associated with a row value at 505. The computer system can also identify a sequence of bits associated with a plane value at 509. The row value can then be mapped to an optimized row value at 511 based on the row value and the plane value. The plane value can be mapped to an optimized plane value at 513. The optimized character code acquired from the mapping at 515 can be used to access the attributes associated with the optimized character code at 517.

It should be noted that the present invention does not require that the steps of this process be performed in any specified sequence. For example, in one embodiment of the invention, the sequence of bits associated with a plane value can be determined before identifying a sequence of bits associated with a row value. The mapping of the row and plane values can also occur in difference sequences.

Figure 6:
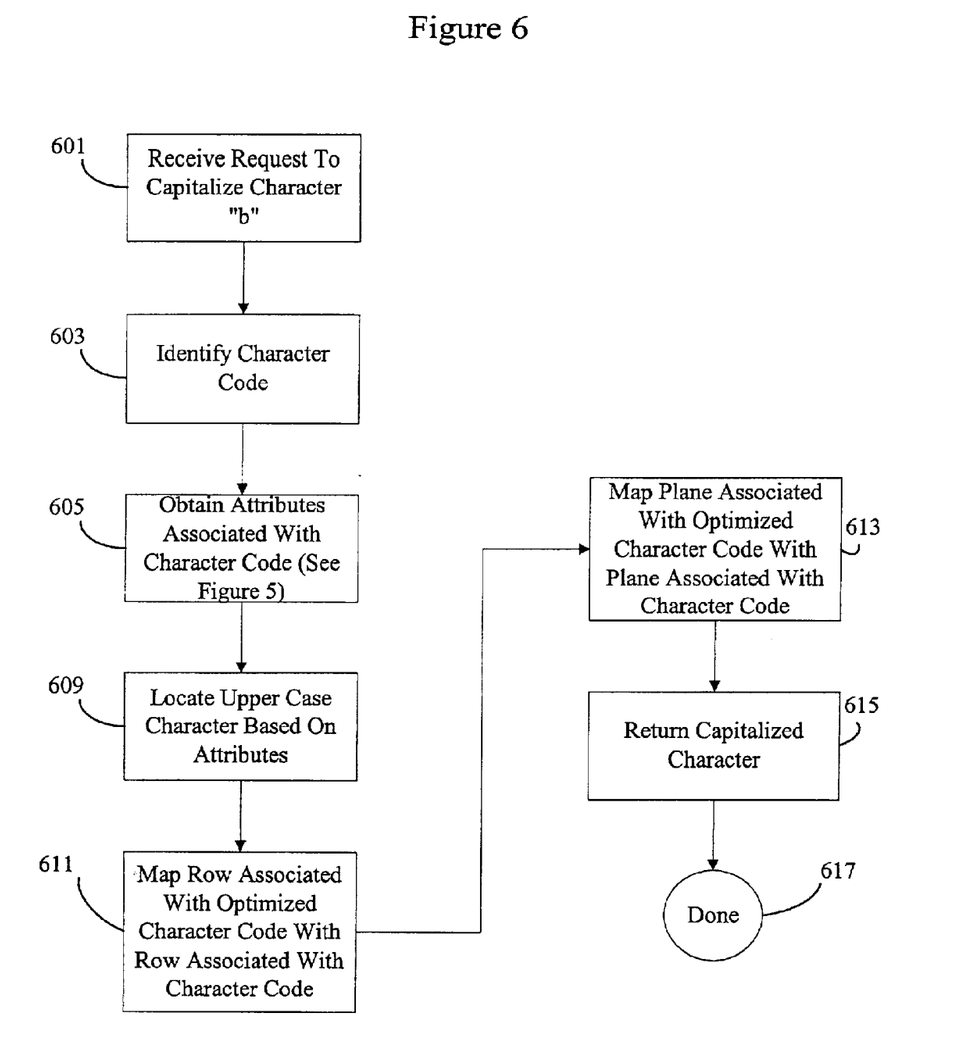
FIG. 6 is a process flow diagram depicting the mapping of an optimized character code to the original character code, according to specific embodiments.

FIG. 6 is a process flow diagram depicting the mapping of an optimized character code to the original character code, according to specific embodiments. A computer system receives a request to capitalize the character "b" at 601. The computer system identifies the character code for the character "b" at 603 and obtains the attributes associated with the character code at 605. To obtain the attributes associated with the character "b," the computer system may undergo the process described in FIG. 5. After the attributes associated with the character "b" are obtained, the computer system locates the upper case character "B" based on the attributes for the character "b." The character attributes for "B" are associated with an optimized character code that needs to be mapped to a non-optimized character code. The row associated with the optimized character code is mapped to a row associated with the character code for "B". The plane associated with the optimized character code is mapped to a plane associated with the character code for "B". The character code for the capitalized character "B" can then be returned.

Figure 7:
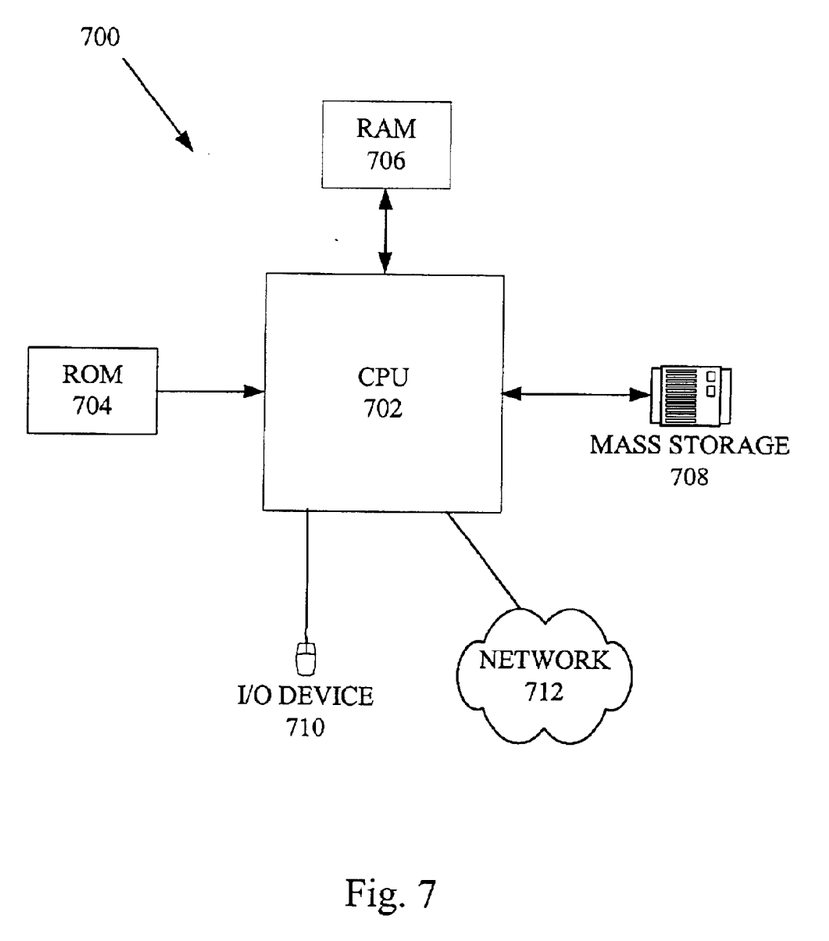
FIG. 7 is a diagram that illustrates a typical, general-purpose computer system suitable for implementing the present invention.

FIG. 7 illustrates a typical, general-purpose computer system suitable for implementing the present invention. As is well known in the art, ROM acts to transfer data and instructions uni-directionally to the CPUs 702, while RAM is used typically to transfer data and instructions in a bi-directional manner. CPUs 702 may generally include any number of processors. The CPUs can process bits in character codes and map the character codes to optimized character codes. The CPUs can also access attributes associated with optimized character codes. Both primary storage devices 704, 706 may include any suitable computer-readable media. A secondary storage medium 708, which is typically a mass memory device, is also coupled bi-directionally to CPUs 702 and provides additional data storage capacity. The mass memory device 708 is a computer-readable medium that may be used to store programs including computer code, data, and the like. The mass memory device 708 can store optimized character codes along with associated attributes. The mass memory device 708 can also store information for mapping character codes to optimized character codes. Typically, mass memory device 708 is a storage medium such as a hard disk or a tape which generally slower than primary storage devices 704, 706. Mass memory storage device 708 may take the form of a magnetic or paper tape reader or some other well-known device. It will be appreciated that the information retained within the mass memory device 708, may, in appropriate cases, be incorporated in standard fashion as part of RAM 706 as virtual memory. For example, attributes associated with optimized character codes stored in the mass memory storage device 708 can be loaded into RAM 706 to allow faster access by the CPUs 702. Information for mapping character codes to optimized character codes can also be loaded into RAM 706. A specific primary storage device 704 such as a CD-ROM may also pass data uni-directionally to the CPUs 702.

CPUs 702 are also coupled to one or more input/output devices 710 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 702 optionally may be coupled to a computer or telecommunications network, e.g., an Internet network or an intranet network, using a network connection as shown generally at 712. With such a network connection, it is contemplated that the CPUs 702 might receive information from the network, or might output information to the network in the course of performing the above-described method steps. Such information, which is often represented as a sequence of instructions to be executed using CPUs 702, may be received from and outputted to the network, for example, in the form of a computer data signal embodied in a carrier wave. The above-described devices and materials will be familiar to those of skill in the computer hardware and software arts.

Information and program instructions may be employed to implement the systems/methods described herein. The present invention can relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (OM) and random access memory (RAM). The invention may also be embodied in a carrier wave travelling over an appropriate medium such as airwaves, optical lines, electric lines, etc. Examples of program instructions include both machine code, such as that produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. The character code mapping system has variety of embodiments. Therefore, the scope of the invention should be determined with reference to the appended claims.

What is claimed is:

1. A method for associating a character code with an optimized character code, the optimized character code having a corresponding attribute set, the method comprising:

receiving a character code having a string of bits;

identifying a first subset of bits in the character code, wherein the first subset of bits identifies a first row; and mapping the first row to a second row associated with an optimized character code in an optimized character code index, wherein mapping the first row identifies an optimized character code for the received character code.

2. The method of claim 1 further comprising:

identifying a second subset of bits in the character code, wherein the second subset of bits identifies a first plane; and mapping the first plane to a second plane associated with the optimized character code in the optimized character code index.

3. The method of claim 2 wherein the second subset of bits has a value of 0 or 1.

4. The method of claim 2, wherein the first subset of bits is a byte.

5. The method of claim 4, wherein the second subset of bits is a byte.

6. The method of claim 2, wherein the character code comprises a third subset of bits identifying a first group.

7. The method of claim 6, wherein the character code comprises a fourth subset of bits identifying a first cell.

8. The method of claim 2, further comprising mapping the first group and the first cell to a second group and a second cell associated with the optimized character code in the optimized character code index.

9. The method of claim 2, wherein the first group and the first cell are equal to the second group and the second cell respectively.

10. The method of claim 2, wherein the first group and the first cell are equal to zero.

11. The method of claim 2, wherein the first and second subset of bits do no include the most significant or the least significant bit.

12. The method of claim 2, wherein the first and second subset of bits do not include the most significant or the least significant byte.

13. A method for associating a character code with an optimized character code, the optimized character code having a corresponding attribute set, the method comprising:

receiving a character code having a string of bits;

identifying a first subset of bits in the character code, wherein the first subset of bits identifies a first row;

identifying a second subset of bits in the character code, wherein the second subset of bits identifies a first plane;

mapping the first plane to a second plane associated with the optimized character code in the optimized character code index; and mapping the first row to a second row associated with an optimized character code in an optimized character code index, wherein mapping the first plane and the first row identifies an optimized character code for the received character code.

14. The method of claim 13, wherein the first group and the first cell are equal to the second group and the second cell respectively.

15. The method of claim 13, wherein the first group and the first cell are equal to zero.

16. The method of claim 13, wherein the first and second subset of bits do not include the most significant or the least significant bit.

17. The method of claim 13, wherein the first and second subset of bits do not include the most significant or the least significant byte.

18. A computer program product comprising a machine readable medium on which is provided program instructions for associating a character code with an optimized character code, the optimized character code having a corresponding attribute set, the computer program product comprising:

computer code for receiving a character code having a string of bits;

computer code for identifying a first subset of bits in the character code, wherein the first subset of bits identifies a first row; and computer code for mapping the first row to a second row associated with an optimized character code in an optimized character code index, wherein mapping the first row identifies an optimized character code for the received character code.

19. The computer program product of claim 18, further comprising:

computer code for identifying a second subset of bits in the character code, wherein the second subset of bits identifies a first plane; and computer code for mapping the first plane to a second plane associated with the optimized character code in the optimized character code index.

20. The computer program product of claim 19 wherein the second subset or bits has a value of 0 or 1.

21. The computer program product of claim 19, wherein the first subset of bits is a byte.

22. The computer program product of claim 21, wherein the second subset or bits is a byte.

23. The computer program product of claim 19, wherein the character code comprises a third subset of bits identifying a first group.

24. The computer program product of claim 23, wherein the character code comprises a fourth subset of bits identifying a first cell.

25. The computer program product of claim 19, further comprising mapping the first group and the first cell to a second group and a second cell associated with the optimized character code in the optimized character code index.

26. The computer program product of claim 19, wherein the first group and the first cell are equal to the second group and the second cell respectively.

27. The computer program product of claim 19, wherein the first group and the first cell are equal to zero.

28. The computer program product of claim 19, wherein the first and second subset of bits do not include the most significant or the least significant bit.

29. The computer program product of claim 19, wherein the first and second subset of bits do not include the most significant or the least significant byte.

30. An apparatus for associating a character code with an optimized character code, the optimized character code having a corresponding attribute set, the computer program product comprising:

memory;

an input mechanism for receiving a character code;

one or more processors coupled with the memory, the processors configured to identify a first subset of bits in the character code, wherein the first subset of bits identifies a first row and map the first row to a second row associated with an optimized character code in the optimized character code index, wherein mapping the first row identifies an optimized character code for the received character code.

31. The apparatus of claim 30, further configured to:

identify a second subset of bits in the character code, wherein the second subset of bits identifies a first plane; and map the first plane to a second plane associated with an optimized character code in the optimized character code index.

32. The apparatus of claim 31 wherein the second subset of bits has a value of 0 or 1.

33. The apparatus of claim 31, wherein the first subset of bits is a byte.

34. The apparatus of claim 33, wherein the second subset of bits is a byte.

35. The apparatus of claim 31, wherein the character code comprises a third subset of bits identifying a first group.

36. The apparatus of claim 35, wherein the character code comprises a fourth subset of bits identifying a first cell.

37. The apparatus of claim 31, further comprising mapping the first group and the first cell to a second group and a second cell associated with the optimized character code in the optimized character code index.

38. The apparatus of claim 31, wherein the first group and the first cell are equal to the second group and the second cell respectively.

39. The apparatus of claim 31, wherein the first group and the first cell are equal to zero.

40. The apparatus of claim 31, wherein the first and second subset of bits do not include the most significant or the least significant bit.

41. The apparatus of claim 31, wherein the first and second subset of bits do not include the most significant or the least significant byte.

42. An apparatus for associating a character code with an optimized character code, the optimized character code having a corresponding attribute set, the method comprising:

means for receiving a character code having a string of bits;

means for identifying a first subset of bits in the character code, wherein the first subset of bits identifies a first row; and means for mapping the first row to a second row associated with an optimized character code in an optimized character code index, wherein mapping the first row identifies an optimized character code for the received character code.

43. The apparatus of claim 42, further comprising:

means for identifying a second subset of bits in the character code, wherein the second subset of bits identifies a first plane; and means for mapping the first plane to a second plane associated with the optimized character code in the optimized character code index.

* * * * *

UNITED STATES PATENT AND TRADEMARK OFFICE
CERTIFICATE OF CORRECTION

PATENT NO. : 6,829,386 B2
DATED : December 7, 2004
INVENTOR(S) : Ienup Sung

It is certified that error appears in the above-identified patent and that said Letters Patent is hereby corrected as shown below:

Column 3,
Line 62, change "0x000834E" to -- 0x0001834E --.

Column 7,
Line 17, change "(OM)" to -- (ROM) --.

Column 8,
Line 11, change "no include" to -- not include --.

Column 9,
Lines 2 and 6, change "or bits" to -- of bits --.

Signed and Sealed this

Twenty-fourth Day of May, 2005

JON W. DUDAS
*Director of the United States Patent and Trademark Office*